Feb. 19, 1957 M. A. TREUHAFT ET AL 2,782,160
ELECTROPOLISHING APPARATUS
Filed March 24, 1951 12 Sheets-Sheet 1

Inventors
CARL E. SWANSON
MILTON A. TREUHAFT
By Curtis, Morris + Safford
Attorneys

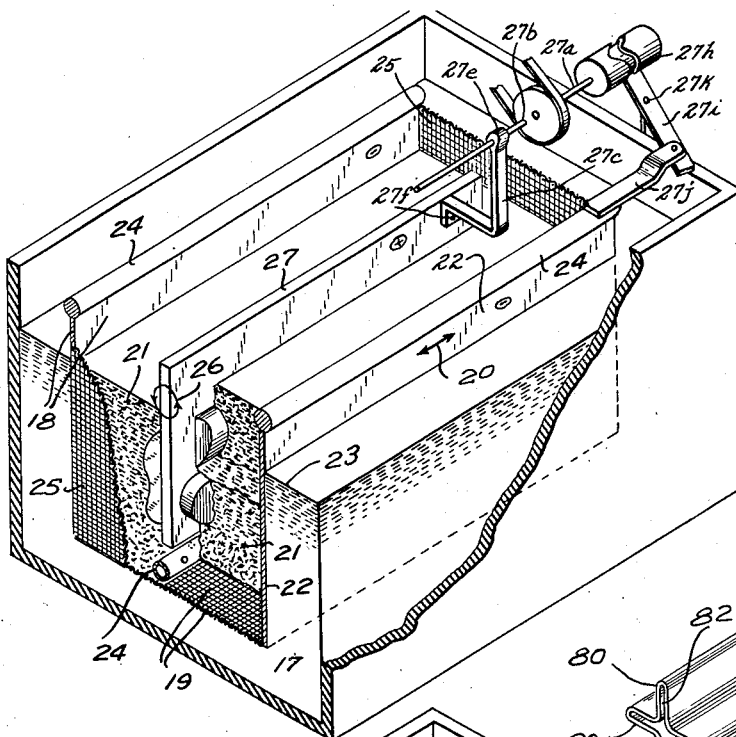
Fig. 6.
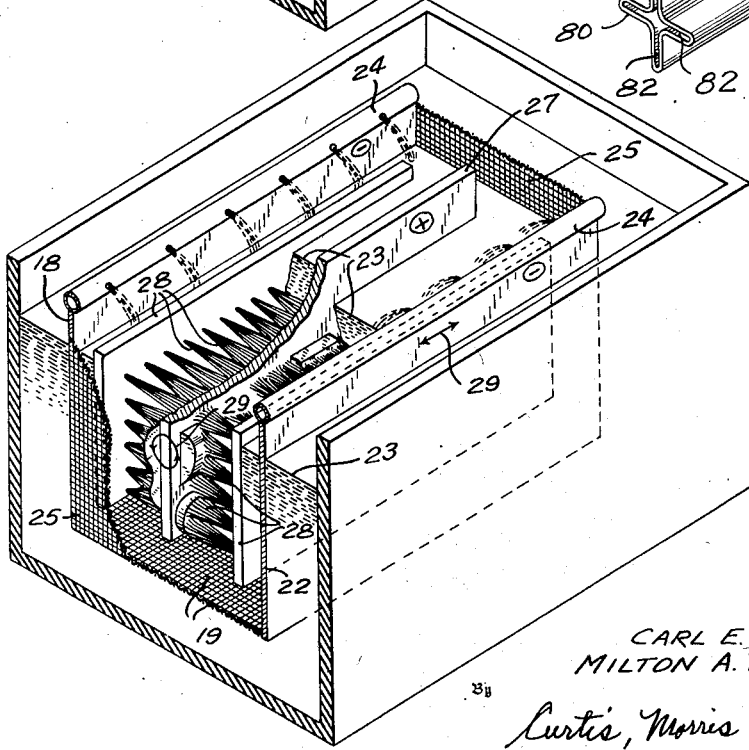
Fig. 8.
Fig. 7.
Inventors
CARL E. SWANSON
MILTON A. TREUHAFT
By Curtis, Morris & Safford
Attorneys

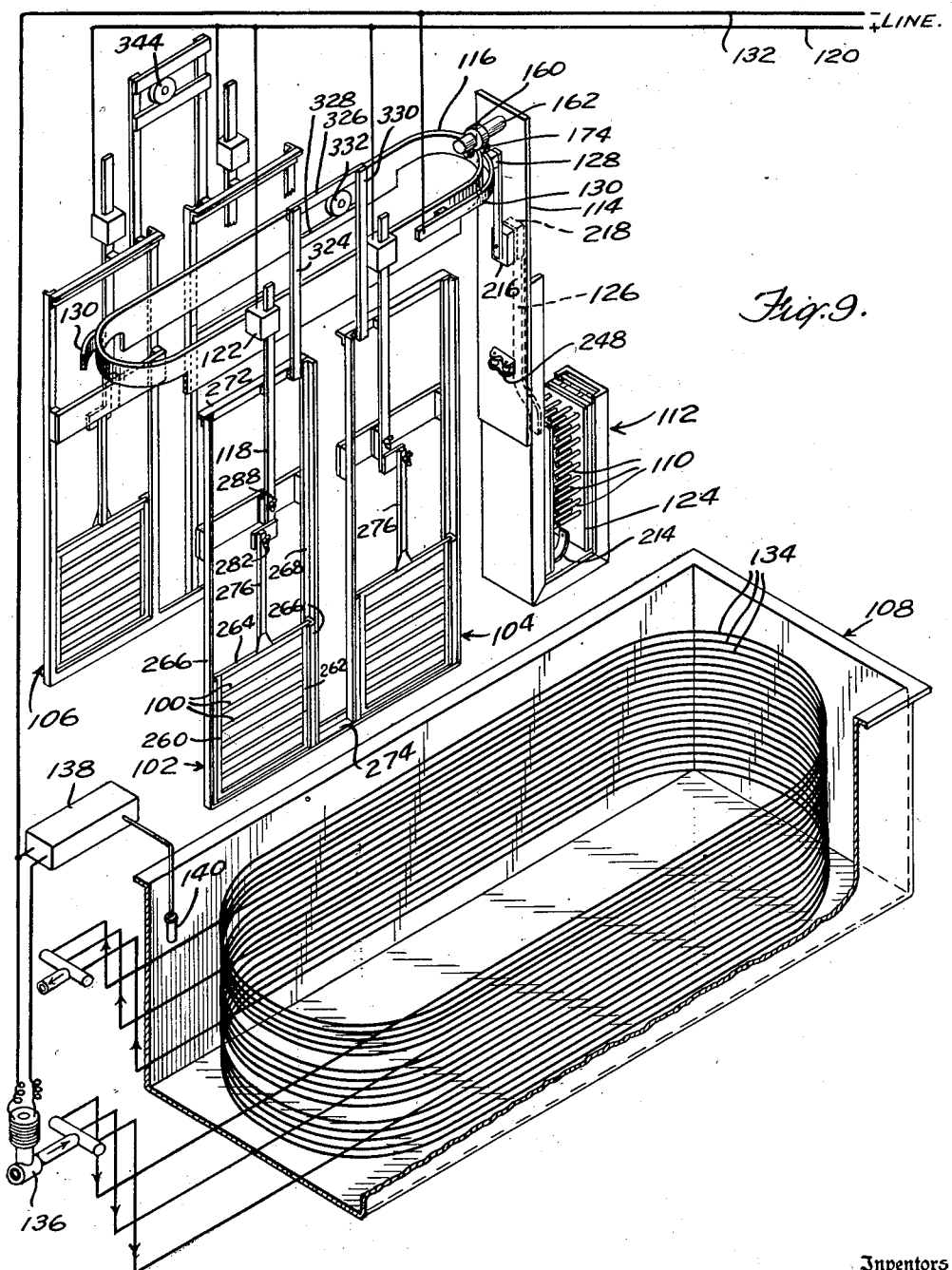

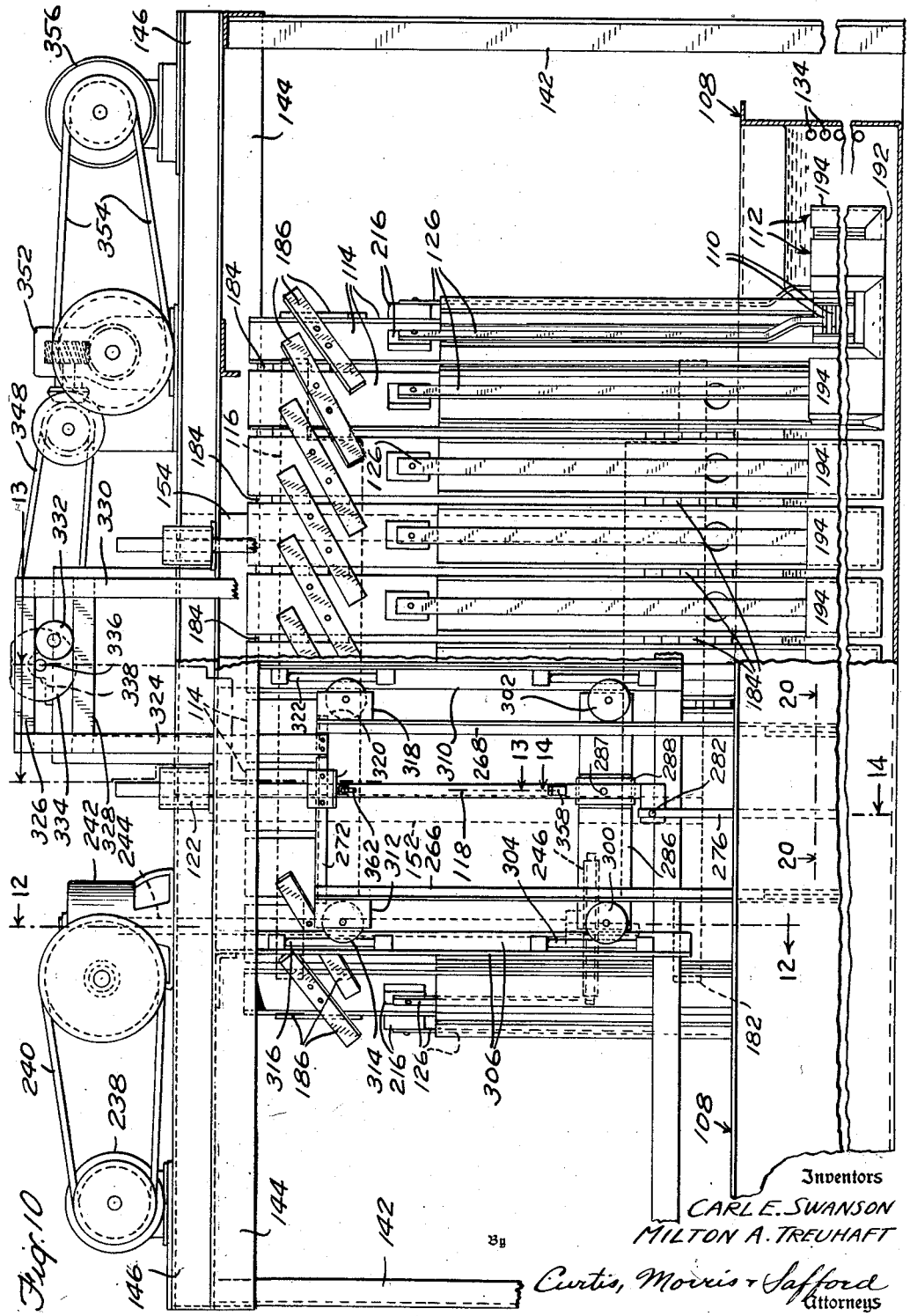

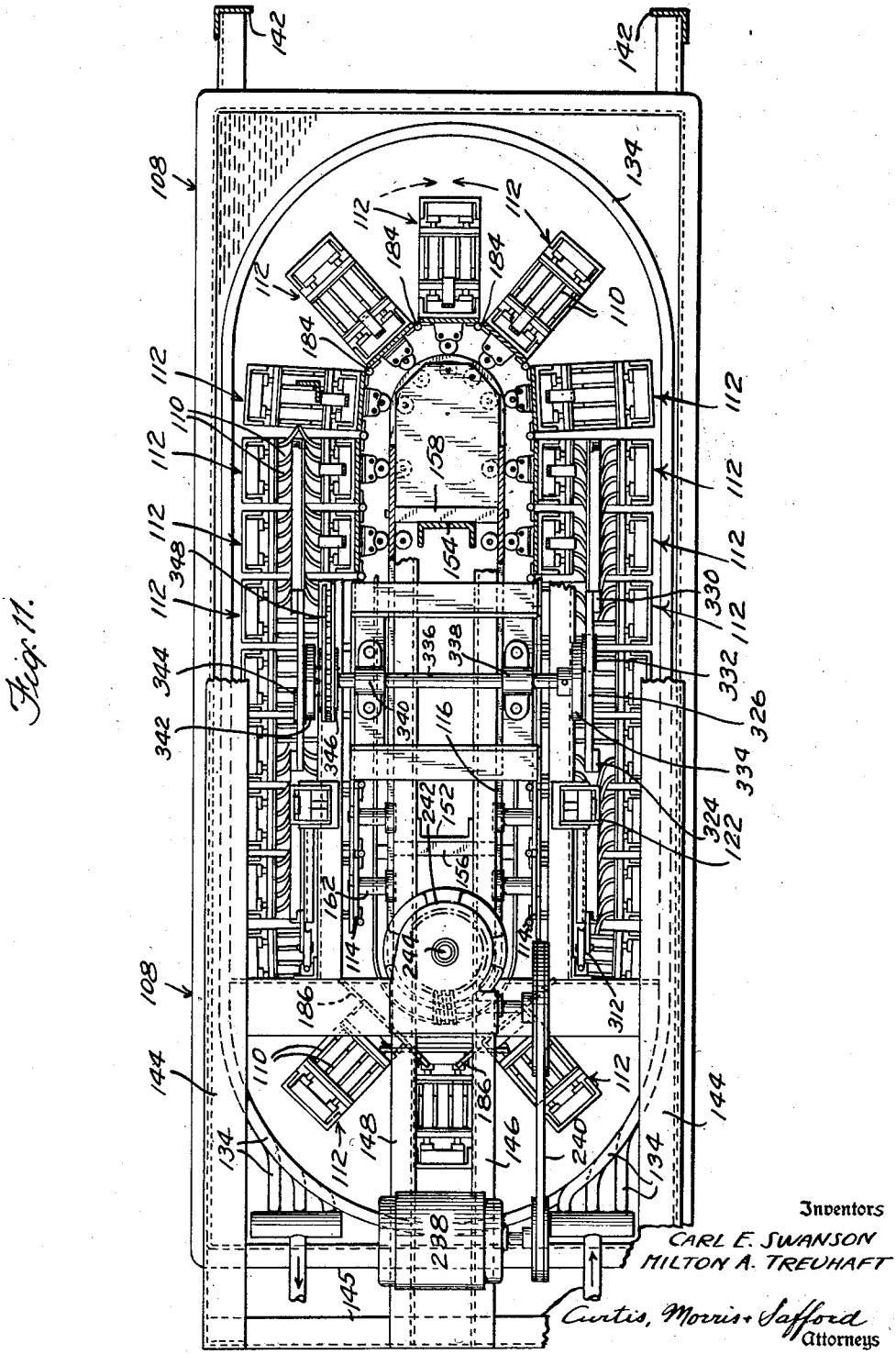

Inventors
CARL E. SWANSON
MILTON A. TREUHAFT
By Curtis, Morris & Safford
Attorneys

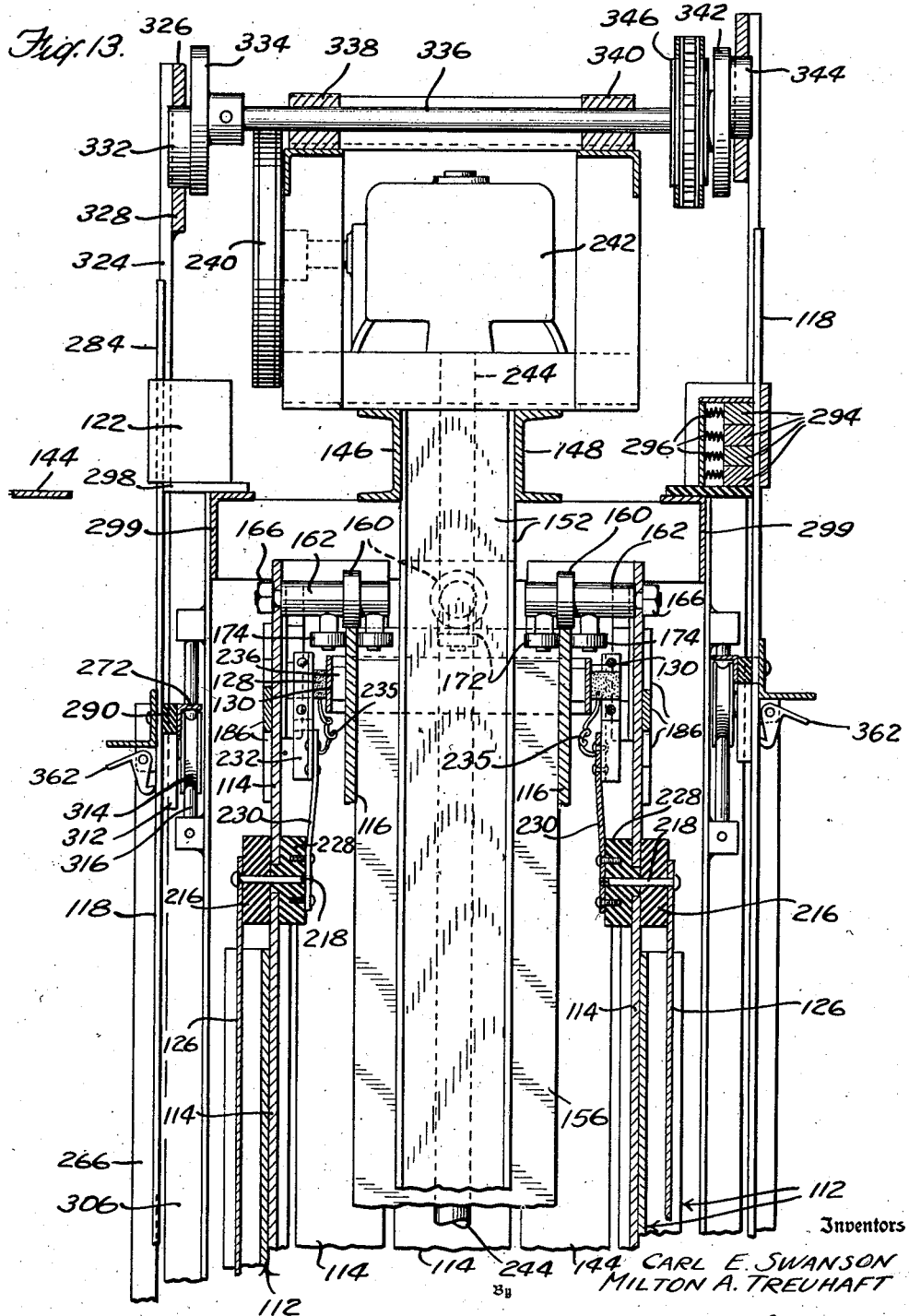

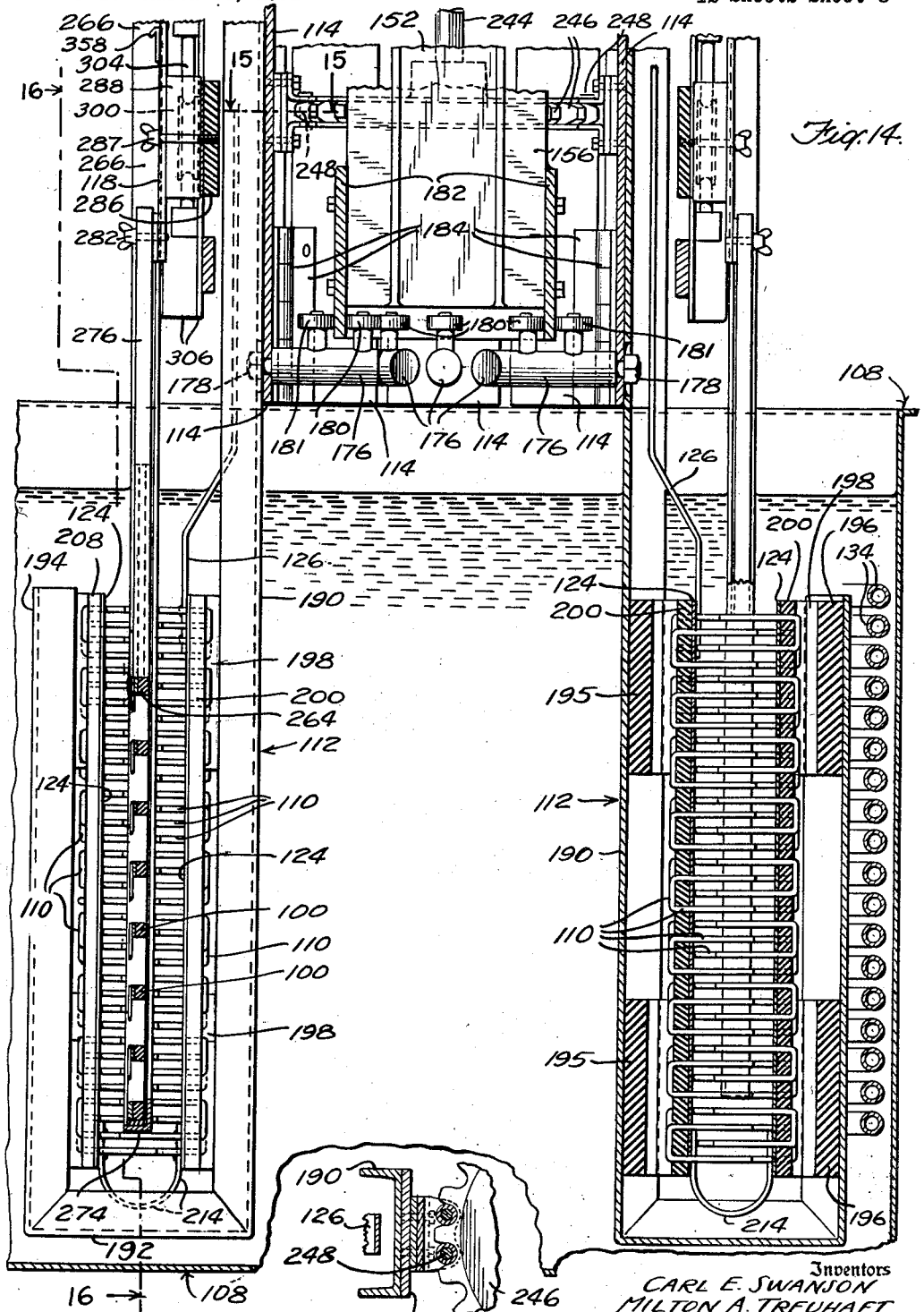

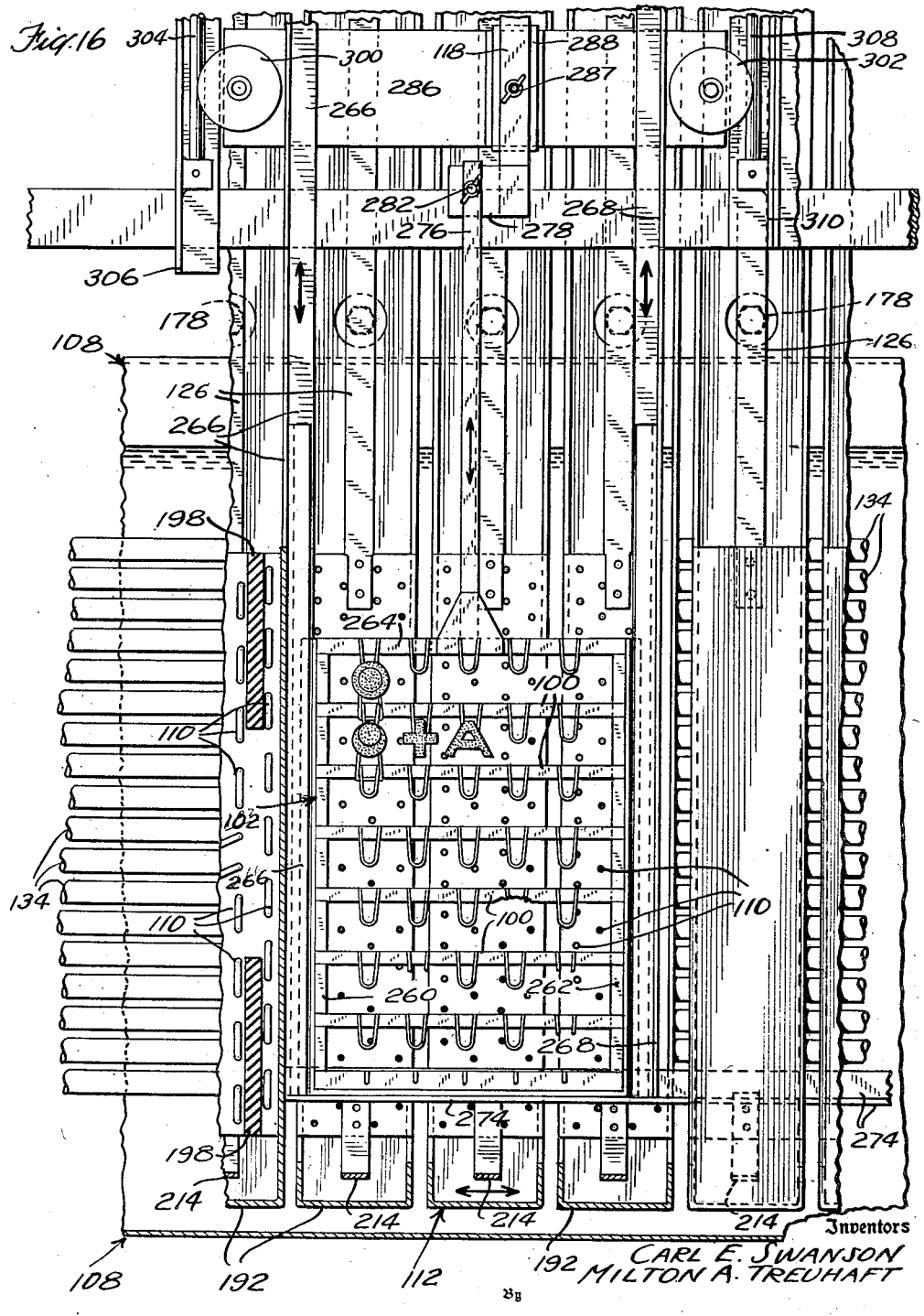

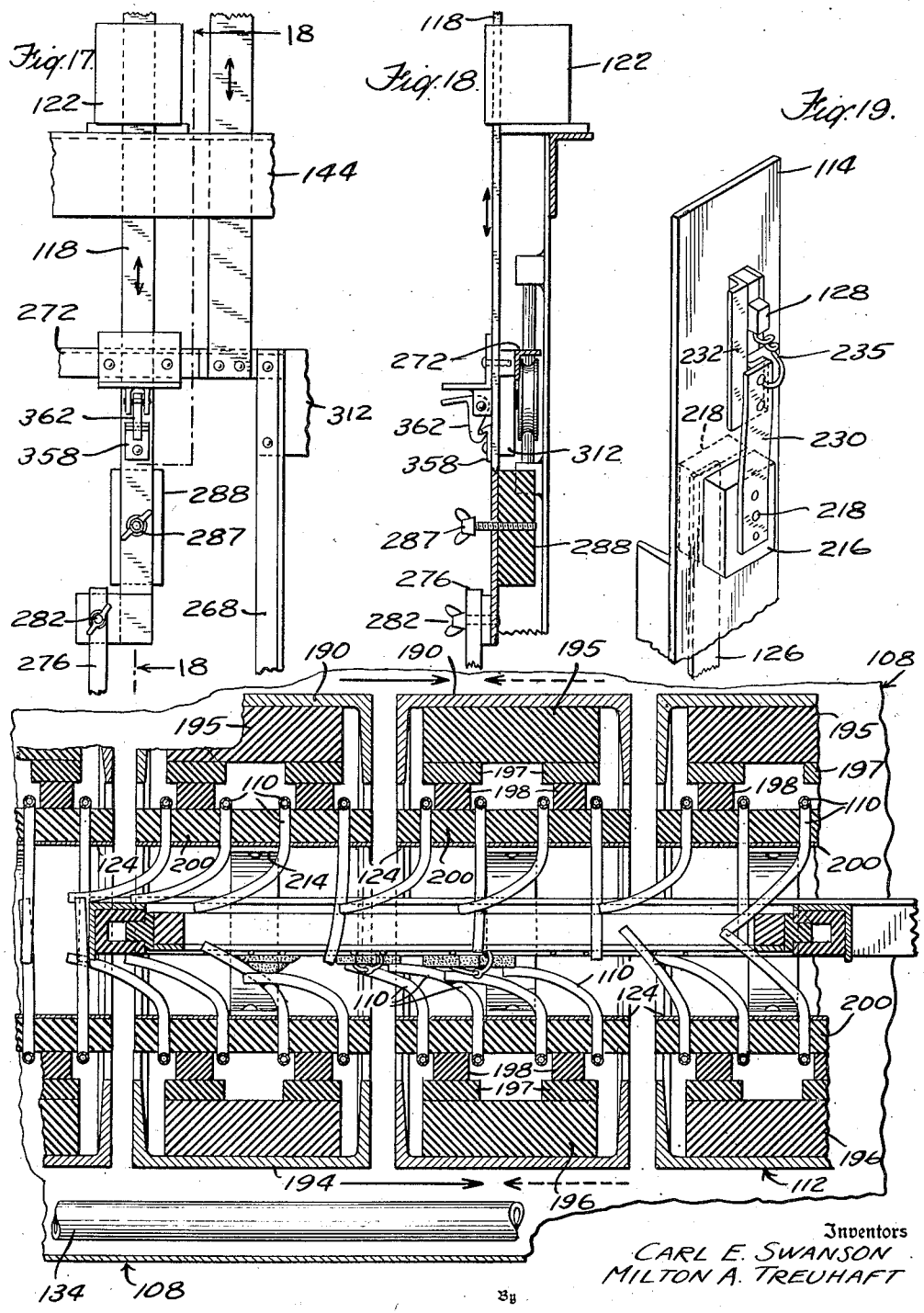

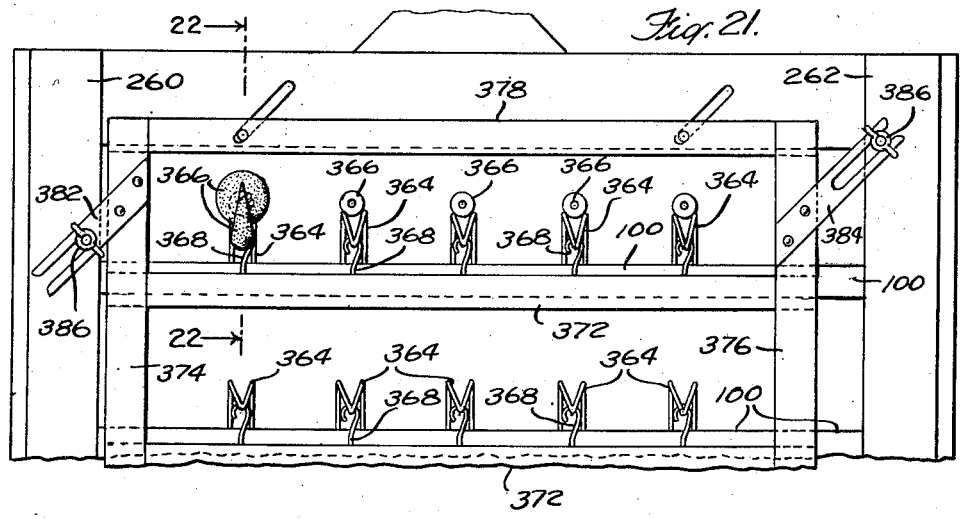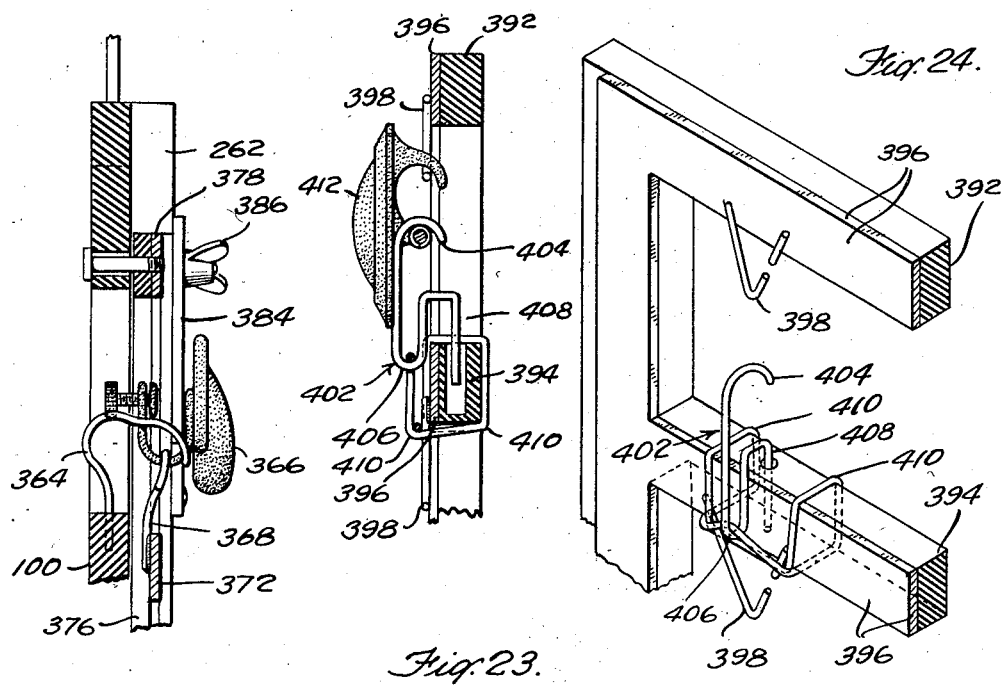

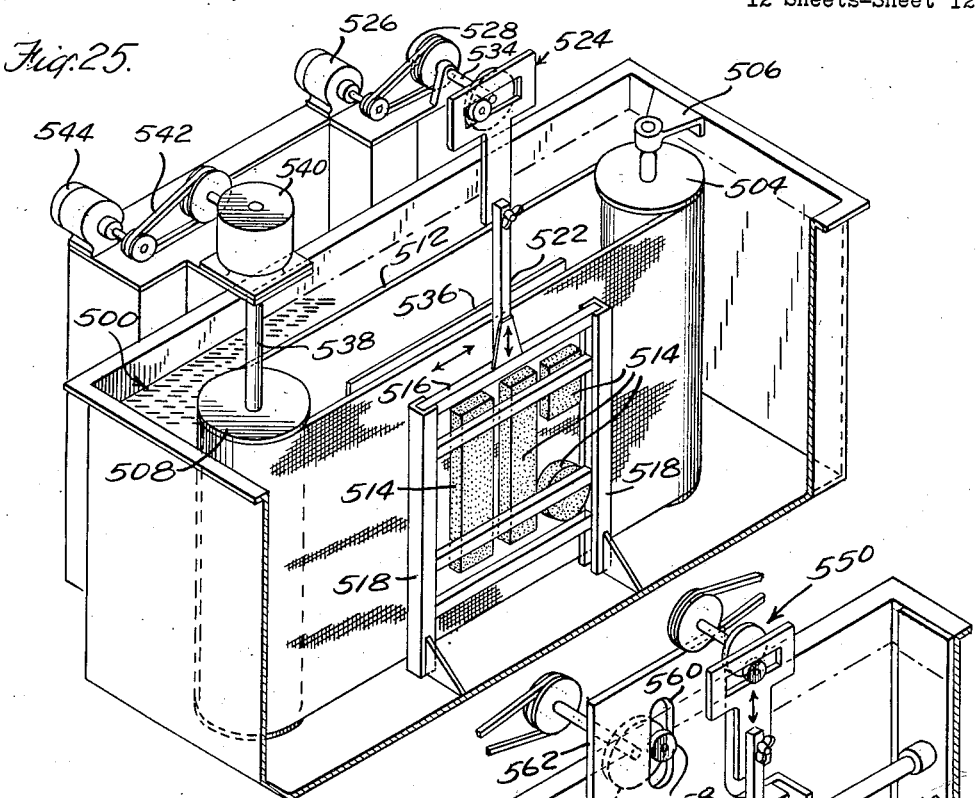
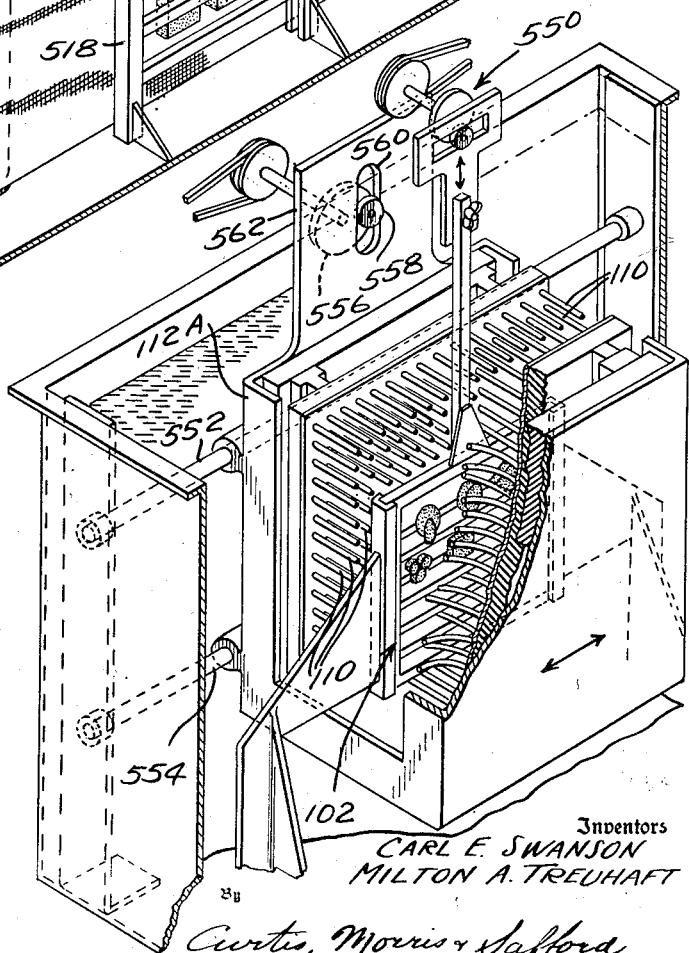

United States Patent Office 2,782,160
Patented Feb. 19, 1957

2,782,160

ELECTROPOLISHING APPARATUS

Milton A. Treuhaft, Newark, and Carl E. Swanson, North Arlington, N. J., assignors to Hudson Electrochemical Company, Union City, N. J.

Application March 24, 1951, Serial No. 217,354

6 Claims. (Cl. 204—222)

This invention relates to a method of and apparatus for electrolytically polishing or buffing metals. More particularly, it relates to a method, apparatus and materials for treating such metals whereby the surfaces are polished or buffed without the necessity of resorting to mechanical abrasion or polishing processes.

It is, therefore, an object of this invention to provide an improved method of and improved means for electrolytic polishing.

The methods heretofore used for electrolytic polishing as a substitute for buffing have not been entirely satisfactory and previous attempts to utilize these prior art methods commercially generally have been unsuccessful.

We have found, in methods of electrolytic polishing known to the art, that the polish tends to be microscopic rather than macroscopic. Macroscopic irregularities are irregularities in the original surface such that each irregularity is visible individually to the naked eye. The electrolytic baths, known to the art, do not eliminate these macroscopic irregularities. The methods of electrolytic polishing heretofore proposed polish these macroscopic irregularities as well as the desired contours of the surface, merely making the macroscopic irregularities lustrous. In some cases this lustre tends to make the macroscopic irregularities stand out more clearly, making the surface appear rougher than it was at the start of the process. This explains the fact that the present practice of electrolytic polishing, while it may be applied to certain surfaces for making samples for microscopic examination, may be even detrimental to these same surfaces for decorative purposes.

Also, we have found that methods previously devised for electrolytically polishing metals do not eliminate visible scratches on the surface of the metal. The scratches behave like the macroscopic irregularities mentioned above. The edges of the scratches are rounded slightly and the scratches are given a lustre, but the scratches themselves are not removed.

It is a further object of this invention to provide means for smoothing down and eliminating macroscopic irregularities and scratches by electrolytic polishing.

The means by which we accomplish these objects includes the application of mechanical wiping to the surface of the anode while subjecting the articles to be polished to an electric current in the presence of a flowing viscous electrolyte. The viscosity of this electrolyte is sufficiently high so that the corrosion products form and remain as a film on the anode surface. We propose to interpose between the anode and cathode a deformable wiping substance which will conform to the desired contours of the anode and which is wiped across the anode surface, the wiping material being maintained clean of any metallic deposits or decomposition products. With the preferred arrangement the cathode may be positioned a substantial distance from the anode and is not required to conform to the shape of the anode.

This wiping of the anode surface with a flexible material during the electrolytic polishing process permits the removal of macroscopic irregularities and scratches from the surface of the metal being polished. In order to better understand how this is accomplished, it is necessary to consider a theory of what happens at the anode surface when wiping is applied.

In methods heretofore devised for electrolytic polishing, the part to be polished is made the anode in an electrolytic bath. By means of electrolysis, the anode is eaten away and the anode corrosion products collect in a film which forms over the surface of the anode. The theory here states that the physical properties of this anode film are such that it tends to form more thickly in the small crevices or valleys on the surface of the anode and less thickly on the small peaks or high points. Because this film impedes the flow of current, less current will flow in the valleys than on the peaks of the anode surface. This means that the peaks will be eaten away faster than the valleys and the surface will tend to become smooth. This explains the electrolytic polishing actions as known to the prior art. However, the initial action of the current, say with respect to a scratch in the surface, is to round off the corners of the scratch. After this action occurs, the difference in thickness of the film formed within and outside the scratch is not sufficient to produce the desired polishing action. If it is attempted to obtain a finer polish merely by extending the time of treatment, the surface is etched and the finish dulled rather than brightened.

When a wiping action is applied to the anode, the film which has been formed is wiped from those points where the wiping surface comes into contact with the anode surface. The wiping surface cannot, in general, reach down into the small crevices in the surface of the anode; therefore, only the high points on the surface are wiped. This action strips the film completely from the high points and allows them to be eaten away much faster than the low points, thus introducing an additional smoothing or polishing action. This new polishing action, which has been introduced by the wiping action, is a much more rapid smoothing action than that normally present in the ordinary bath polish where no wiping is present, thus largely overcoming etching effects which would dull the finish. The reason for this is that in the non-wiped bath polish, the film is only slightly thinner on the high points than in the crevices, while in the wiped type of polish, the film is completely removed from the high points. This gives a much greater relative rate of attack on the high points than in the valleys, and consequently a much stronger polishing or buffing action results.

Because the thickness and tenacity of the anode film is a function of the viscosity of the bath, the optimum pressure of the wiping material against the anode surface will depend upon the characteristics of the bath and the temperature at which the operation is performed. It is important therefore to maintain constant temperature. If the viscosity drops too low, film formation may become impossible.

Hence, it is now apparent that wiping the anode in an electrolytic polishing process introduces a rapid and effective smoothing action. Moreover, this polishing action is due to the wiping material wiping the film off the high points of the anode surface. We now propose that this material and the wiping motion be chosen such that it will wipe the film off the macroscopic high points, but will leave the film intact in the macroscopic valleys. By wiping off of this film we mean that the film material is moved away from the surface, so as not to impede the polishing action, and not that it is merely transferred to a wiper which is held over the surface being polished. Moreover, the preferred wiping medium is one in which the cross-section of the wiper is deformed as it wipes against the surface of the article to be polished, the characteristics being selected so that the wiper will conform to the contours to be retained, but will not conform to the macroscopic or microscopic imperfections that are to be removed.

The macroscopic high points are now subject to a much faster rate of electrolytic attack than the macroscopic valleys. Thus, it will be clear that the new rapid polishing action introduced by wiping buffs and polishes the surface macroscopically, and that this new polishing action polishes microscopically too.

Initially those microscopic irregularities which are situated in the macroscopic valleys, are protected from the wiping action. However, as the macroscopic peaks are eaten away, the film which has been built up in the valleys is gradually wiped away, so that the film over the microscopic high points which reside in these macroscopic valleys is first thinned and finally wiped away so that such high points are exposed to the electrolytic polishing bath, while the microscopic low points are still somewhat protected from the wiping action. Hence, the polishing action is not dependent on differences in film thickness. Even if the film produced in a polishing bath without wiping were completely uniform over the peaks and valleys and alone could have no polishing action, the wiping action of the present invention would produce a polished surface by the electrolytic action. We have found in the wiped-anode electrolytic process, that since the polishing action due to wiping is so much stronger than the non-wiped polishing action, the latter seems to enter into the process only as a secondary effect.

We have found also that when the part to be polished electrolytically is made the anode in a chemical bath, bubbles collect on the surface of the anode and may cling to this surface very tenaciously. These bubbles sometimes remain in more or less fixed positions during the electrolytic polishing process and because they affect the current may cause irregularities corresponding to their positions to appear on the surface of the metal. Such imperfections are particularly objectionable where a bright mirror-like surface is desired for decorative purposes.

It will be clear that mechanically wiping the surface of the anode will remove the anode film and the bubbles which cling to it. However, because the material used to wipe the anode will in general obstruct the flow of the electrolytic current, it is necessary intermittently to remove it from or move it along the anode surface. This allows the current to flow again and the bubbles and film again to form on the anode. The surface must be wiped with such frequency that the bubbles are not allowed to remain on the anode long enough to cause irregularities on the surface, and with such frequency as to attain a rapid polishing action.

In order to better illustrate the action of wiping in the electrolytic polishing bath, it is useful to draw an analogy with the corresponding buffing operation. In buffing, a flexible material, usually cloth, is used to wipe across the surface of the work. This cloth conforms to the contours and bears against the high points on the work. The abrasive, which is put on the cloth in the buffing operation, cuts down these high points while leaving the low points intact. Thus, the surface becomes smooth.

In the wiped electrolytic polishing process, a very similar thing happens. A resilient material wipes across the work and it bears against the high points on the anode surface. Instead of the abrasive cutting these high points down as in the buffing operation, anode film is stripped from these high points and they are eaten away by the electrolytic current. A high current eats the high points away rapidly and acts like a coarse abrasive whereas a low current eats the high points away more slowly and acts like a fine abrasive. This action in the wiped electro-polishing process is so similar to buffing as to explain why the wiped electrolytically polished surface has the appearance of a buffed surface.

It is therefore an important object of this invention to provide means for producing an electrolytically polished surface which is similar to a buffed surface.

Several embodiments of the invention are illustrated and described herein and apparatus, particularly adapted for commercial applications, is described in detail. In one embodiment provision is made for the continuous movement of the wipers along a continuous path, and for the simultaneous movement of the article or articles being polished along a different and transverse path. Means are provided to maintain a non-synchronized relationship between these two movements to prevent a repetitive pattern of movement from being established over the surface being polished.

Such apparatus is adapted for the simultaneous polishing of a large number of small articles, such as costume jewelry, and racks particularly adapted for supporting the articles are described. The apparatus, however, can be modified for electro-polishing of larger objects. Moreover, the apparatus is not limited in its application to electro-polishing, but can be used, for example, in electro-forming or plating operations wherein a surface is built up by alternate plating and deplating operations.

These and other aspects, objects, and advantages of the invention will become apparent from the following description considered in conjunction with the accompanying drawings, in which:

Figures 6 and 7 are, respectively, isometric sectional views of types of apparatus suitable for carrying on the electro-polishing operation in accordance with the present invention;

Figure 8 is a partial perspective view of a wiper element suitable for wiping the anode surface during the polishing process;

Figure 9 is an isometric view showing certain parts of another apparatus embodying the invention;

Figure 10 is an elevational view showing further details of the machine shown in Figure 9, portions of the machine being omitted or cut away to clarify the illustration;

Figure 11 is a plan view of the machine shown in Figure 10, certain portions of the machine being cut away to show the construction and arrangement of parts that would otherwise be concealed;

Figure 13 is an enlarged partial sectional view taken along line 13—13 of Figure 10;

Figure 14 is an enlarged partial sectional view taken along line 14—14 of Figure 10;

Figure 15 is a partial sectional view taken along line 15—15 of Figure 14 showing the arrangement for driving the conveyor plates that support the wipers;

Figure 16 is an enlarged partial sectional view taken along line 16—16 of Figure 14 showing one of the racks supporting the articles to be electro-polished;

Figure 17 is an enlarged detail view showing the arrangement for supporting one of the racks to which the articles being polished are secured;

Figure 18 is a sectional view taken along line 18—18 of Figure 17;

Figure 19 is an isometric view showing the arrangement for making electrical contact with the cathodes;

Figure 20 is an enlarged partial sectional view showing the position of certain of the wipers in passing across the surfaces to be polished;

Figure 21 is a partial elevational view of one of the racks for supporting the articles to be polished;

Figure 22 is an enlarged partial view taken along line 22—22 of Figure 21;

Figure 23 is a sectional view showing another arrangement for supporting the articles to be polished;

Figure 24 is a perspective view of the supporting arrangement shown in Figure 23;

Figure 25 is a diagrammatic representation of a machine for electro-polishing flat or smooth surfaces; and Figure 26 shows another embodiment of the electro-polishing apparatus.

Figure 1:
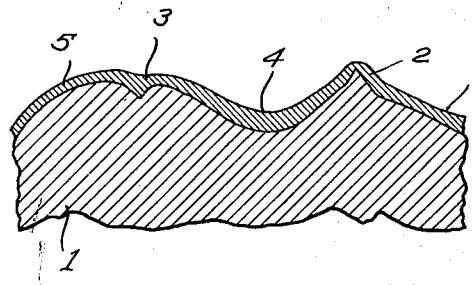
Figure 1 is a fragmentary sectional view on a magnified scale taken through a surface being subjected to electro-polishing near the start of the polishing operation.
Figure 2:
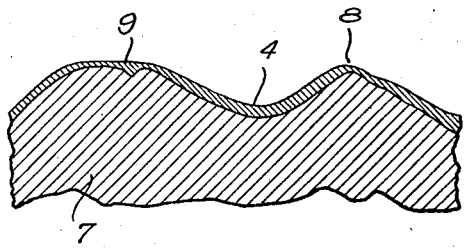
Figure 2 is a corresponding view of the same article after polishing has progressed substantially to completion in accordance with methods hitherto known.

In Figures 1 and 2, the mechanism of the present art of electrolytic polishing is shown. In Figure 1, a highly magnified cross-section of the anode surface, that is, the surface to be polished, is shown at the start of the polishing action. There are irregularities on its surface, for example, a peak 2 and a crevice 3. These irregularities may be considered to be microscopic since they are not distinguished individually with the naked eye. The wider more gradually curved valley 4 and peak 5 may be considered to be macroscopic because they can be distinguished individually by the naked eye. In the electrolytic process, an insulating film 6 of anode corrosion products forms over the surface of the anode. It will be noticed that the thickness of the film is somewhat greater in the valleys than on the peaks. The relative thickness of the film is the important factor in ordinary electrolytic polishing because it controls the relative rates of attack on the peaks and valleys of the surface, and hence the polishing action of the process. The drawing indicates that the thickness of the film in the microscopic valley relative to the film on the microscopic peaks is greater than in the corresponding macroscopic case.

In Figure 2, the anode 1 of Figure 1 is shown after being electrolytically polished in an ordinary manner. This anode, now designated at 7, has been subject to a certain amount of smoothing. The peak 2 has been considerably rounded and somewhat reduced in size and is now represented by 8, and the valley 3, now represented by 9, has had its edges rounded off. However, the gradually curved valley 4 and the gradually curved peak 5 have been subject to almost the same rate of attack, since the depth of the film over them is approximately equal. Hence, relative to each other they have remained approximately the same and very little macroscopic polishing has taken place. Moreover, because the surface of a metal is not completely homogeneous, certain minute areas will be attacked more rapidly than others even though the film thickness is identical. Thus, continued processing of the surface shown in Figure 2 will produce an undesirable etched appearance.

Figure 3:
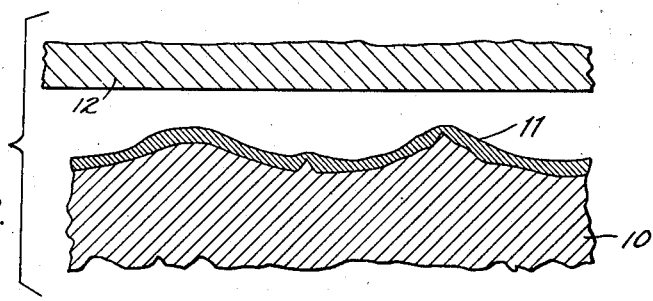
Figure 3 is a view corresponding to Figure 1 but showing another surface portion being subjected to electro-polishing in accordance with the present invention.
Figure 4:
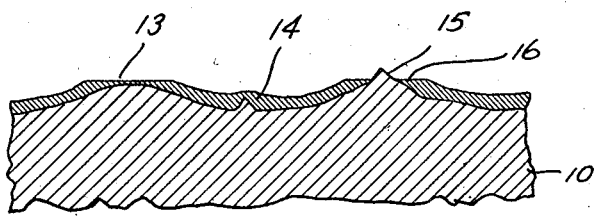
Figure 4 is a view corresponding to that of Figure 3 showing the same surface after wiping.

The macroscopic polishing action which occurs when the anode surface is wiped in accordance with this invention, will be better understood by reference to Figure 3 which shows an anode 10 with macroscopic and microscopic irregularities. The insulating film 11 covers the macroscopic irregularities more or less uniformly and a wiping surface 12 is in position for wiping the anode surface. In Figure 4 is shown the anode surface after the wiping action is complete. The tops of the macroscopic irregularities 13 and 16 have been stripped of the film and are now subject to rapid attack by the solution, whereas the valleys are still coated and there the attack will be slow. After a period of time the film will be rebuilt on the peaks of the macroscopic irregularities and wiping again will be necessary. We therefore propose means for alternately wiping the anode and exposing it to the action of the electrolytic current until a smooth surface is obtained. Thus, although the formation of a film, which inhibits or slows down the electrolytic solving action by which the metal is converted to salts or other compounds, is important to this invention as it is to all electro-polishing, this invention does not require that the film produce a differential action on the high and low points. Therefore, one may now use, with advantage, an electrolytic solution which so quickly polarizes all exposed surfaces as to substantially inhibit almost all electrolytic solving action except during the instant immediately following the wiping away of such film.

It is apparent from the drawings that the polishing action of the process described above is much greater than available in the ordinary bath electrolytic polishing operation. When the anode is wiped, the film is completely stripped from the high points as in Figure 4, whereas if no wiping is used (Figure 1), the film is merely thinner on the high points. This applies to the macroscopic irregularities 13 and 16 and to those microscopic irregularities on the peaks of the macroscopic irregularities such as 15.

Figure 5:
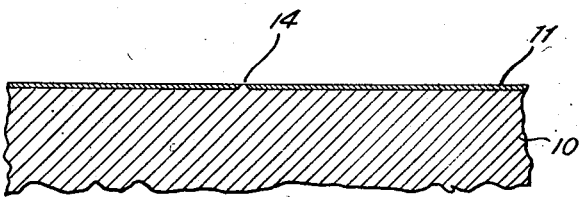
Figure 5 is a view corresponding to that of Figures 3 and 4 showing the same surface near the completion of the polishing operation.
Figure 12:
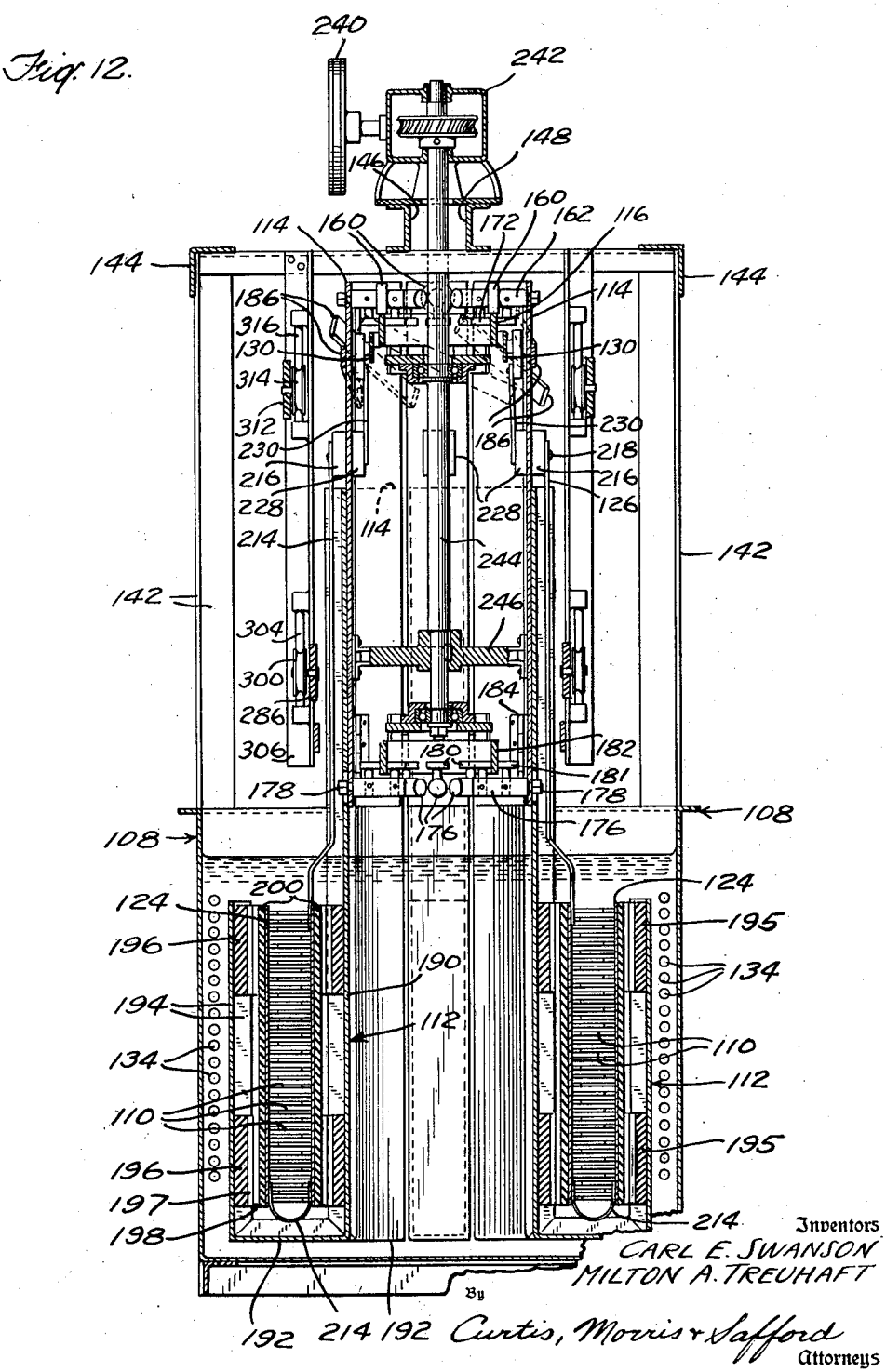
Figure 12 is a vertical sectional view taken along line 12—12 of Figure 10.

However, the microscopic irregularity 14, which resides in the macroscopic valley between the peaks 13 and 16, is protected from the wiping action by these macroscopic peaks. In Figure 5 is shown the same section of the anode surface as shown in Figure 4, but after wiping and electro-polishing action according to the present invention has almost completely smoothed the surface. The microscopic irregularity 14 is now somewhat reduced but still present. The macroscopic peaks 13 and 16 have been eliminated and the microscopic peak 14 is now subject to wiping and thereafter will be exposed to rapid electro-polishing action. This illustrates that wiping is useful for microscopic polishing as well as macroscopic polishing. It should be understood, however, that the present invention can be adapted also to leave macroscopic contours of desired size while polishing out smaller irregularities.

We have found a large number of materials to be suitable for use in wiping the anode. A partial list of these includes rubber tubing, brushes with resilient bristles, sponge rubber, cloth, sheepskin, and felt. In general, the type of material required for wiping depends on the contours of the anode surface and the roughness of this surface. Thus, for an anode whose contours are very irregular, a very flexible material will be needed to conform to those contours and properly wipe them. Where the contours are fairly regular but where the surface to be polished is rough, then a material of lesser flexibility is needed so as not to flex into the macroscopic crevices and wipe the film out of them. For irregular contours the wiper should be capable of sufficient deformation to follow the desired contour, but to rub over the irregularities which should be polished out. Thus, bristles which are not deformable in cross-section or which are too small in diameter usually are not the most effective, but tend to produce striations or line imperfections on the polished surface. Material such as rubber which flattens out and wipes across an appreciable area is more effective for most purposes.

The pressure with which the wiping material is held against the anode during wiping, affects the selection of materials suitable for the wiping and the practical results obtainable with a given material in a given bath and with a given wiping motion. If the pressure is too light, there is very little if any advantage from the wiping and the anodic piece at the end of the treatment will have substantially the appearance and surface condition which would be obtainable by non-wiped electrolytic polishing. If the pressure is too heavy, the film may be wiped out of valleys as well as from the peaks and little polishing action will be evident on the finished piece. In the process of the present invention, the pressure is sufficient to assure removal of the film from the high points but insufficient to drive the wiping material down into the valleys with the scouring action necessary for film removal. Obviously, the precise pressure required will depend upon the wiping material, a stiffer material can exert a higher pressure on the peaks without flexing over them sufficiently to scour out the valleys, upon the speed of the wiping motion, and upon the character of the bath and the operating voltage. With very rapid film formation and with tougher films, higher pressure or more rapid wiping motion may be necessary to keep the high points exposed.

Two other factors must be considered in the practical utilization of this invention. The first is the proper chemical solution to use in the electrolytic polishing tank and the second is the motion necessary to wipe the work. The solution, as already stated broadly, need only be one which can electrolytically remove metal from the anode and provide a film on the anode surface which inhibits or delays further electrolytic solving action.

We have found a solution of orthophosphoric acid and water to be satisfactory for rapid polishing. The proportions used were 70% orthophosphoric acid and 30% water by weight. This solution is suitable for work on copper and its alloys and nickel and its alloys. However, this solution is rather corrosive and it has a tendency to attack certain wiping materials when immersed in the bath. This solution is suitable where a coarse buffing action is desired because of the rapidity of its action.

We have found 85% orthophosphoric acid particularly good for polishing copper and copper alloys, but it is good also for other metals. Varying percentages of sulfuric acid can be used satisfactorily in the process. Glacial acetic acid can be used satisfactorily in the process and in general strong acids, individually and in mixtures which are viscous or syrupy in nature. Acids which are too thin to assure the film formation can be combined with other ingredients which add viscosity to the solution.

We have found useful the addition of an inert non-conducting viscous substance which is miscible with the acid and not appreciably decomposed by it, such as glycerine. Taking one volume of the above phosphoric acid solution to one volume of glycerine gave a solution that was much less corrosive. In the solution containing the glycerine, it was possible to use many wiping materials, such as cloth and sheepskin, since the glycerine solution attack on materials of this type was so slow as to be negligible. Also, heating is moderate in this type of solution because of the lower current density, but the polishing time is lengthened somewhat. The polish obtained using this solution generally is finer than that obtained without the addition of the glycerine. The glycerine also serves to increase viscosity and thus aids in film formation. In like manner, other addition agents known in the art of electroplating to slow down the electrolytic action can be used and especially those which also reduce the corrosive effect of the acid.

One of the most satisfactory solutions that we have discovered is made of equal volumes of dextrose and orhophosphoric acid solutions. The orthophosphoric acid is used in its commercial form of 85% acid to 15% water by weight, and the dextrose in the form of a syrup made by melting crystalline dextrose. This solution is economical of current density and it is not critical as to time of polishing or temperature. The proportions of the solution are not critical either; satisfactory results being obtained up to doubling or halving either ingredient.

These are only a few of many solutions which may be used and the scope of the broader aspects of this invention is in no way limited to their use.

It is important to control the variables of the process in order to obtain optimum polishing action. In general, a variation in one variable of the system can be compensated by a suitable change in another variable. For example, an increase in temperature causes a reduction in the thickness of the anode film which can be compensated by increasing the current density, for example, by increasing the applied voltage, to build up the anode film at a faster rate. The effects of increasing the wiping speed or the wiping pressure can be offset largely by increasing the current density to cause an increased rate of film formation. If the viscosity of the solution increases causing an excessive film thickness, the current density should be decreased to produce a lower rate of film formation.

In one embodiment of our invention, the wiping action is provided by motion of the anode in a suspension of sponge rubber particles. This will be better understood by reference to the drawings. In Figure 6 is shown a cross-sectional view of the electrolytic polishing tank. The work to be polished is made the anode 27; and as shown in Figures 6 and 7 consists of a plate with irregular projections thereon. A basket is made up of two metal plates, 18 and 22, which form the sides of the basket and the pieces of metal screen 19 and 25 which form the bottom and the ends of the basket. The whole basket is made the cathode and it is filled with particles of sponge rubber 21. The two metal plates 18 and 22 carry most of the cathode current. The metal screen 19 and 25 serves to confine the sponge rubber without seriously restricting the circulation. The anode is inserted into the basket below the level of the solution 23. The anode, in this particular embodiment, is given a circulatory translational motion in a plane perpendicular to the two cathodes 18 and 22. That is, each point on the anode moves in a circle whose plane is perpendicular to 18 and 22 and each line in the anode remains parallel to its original position. This is illustrated by the arrow 26. The basket is given a motion back and forth as indicated by the arrow 20. With these two motions every part of the anode surface is subject to wiping by the sponge rubber particles. The two motions are preferably independent with a random relationship so that the anode is wiped by a constantly changing group of sponge rubber particles and no wiping pattern results on the anode. It will be understood, of course, that the wiping action is a relative motion between anode and wiper, consequently the absolute motion may be imparted to either or both to produce the desired relative motion. As one example, a brass article connected as anode and treated as described above, at a temperature of 30° C. a current density of one-quarter ampere per square inch (of anode surface) and five volts between the electrodes and a wiping velocity of 15 R. P. M., polishing was complete in 15 minutes.

The wiping in this embodiment has an alternating feature desirable for proper electrolytic polishing. Each sponge rubber particle which bears against and moves across the anode surface, wipes the film away from the high points in its path. The sponge rubber particle is then carried away from this particular part of the anode surface and the current is again free to flow and it again forms the film at this particular point. Thus, the size of the particles and the speed of the motion determine how often the film is formed and wiped in a given interval of time.

Since the sponge rubber mass may restrict the solution and impair its circulation, there is danger of local overheating of the solution within the sponge rubber mass and of the solution becoming exhausted in the vicinity of the electrodes unless some means of circulation is provided. We accomplish this by providing a pumping system and the manifolds 24 running the length of the baskets, to circulate the solution to the locations within the tank 17 where the bath is subjected to the polishing current.

If the injection of liquid through the perforations or jets of the manifold 24 is gradually increased a condition will be reached in which the particles are in a state of teeter i. e., are supported by the flow, which counteracts their tendency to settle, and the particles in consequence are in constant motion bouncing against each other and the surfaces exposed to them. If this condition is maintained, this spontaneous motion of the particles can be used instead of an externally imposed motion of the body as a whole; and in this case the statistical averages of particle movements cover the surface instead of any planned transitional or rotary movement of the wiper as a whole.

If the particles thus used in teeter are very small they will tend to get down into small crevices and to wipe all surfaces except the very small valleys and the narrow spaces between projections. Thus, one may polish a decorated or etched surface without destroying the etching or decoration; with larger particles, the etching or fine detail of decoration would tend to be polished off, and for the same reason irregularities of that order of magnitude can be polished from surfaces where they are not desired. Instead of using motion in teeter, the wiping particles can be entrained in a liquid and flowed over the surface being polished.

Since this action is essentially a rubbing and scrubbing action, a wide variety of materials can be used. In general, abrasives will not be used because they tend to produce scratches which it is the purpose of electro-polishing to eliminate. Hard particles even if non-abrasive are not recommended because they tend to have point contact with the surface. In general, it has been found best to use softer resilient materials (such as rubber) which exert a squeegee action on the metal surface to clean away the polarizing film.

Many differently shaped items may be electrolytically polished in such equipment. It is not necessary to alter the shape of the cathode surfaces to accommodate each new shape of work piece, and if the resilient or suspension type wiper is used it accommodates itself to each new shape automatically.

The relative movement may be brought about by any well known or suitable mechanism as, for example, by a drive shaft 27a carrying one or more eccentrics 27b which, in the present instance, operate through the medium of resilient frames 27c and 27d pivoted at 27e and connected at 27f with holding means 27g for the plate 27. From a worm cam 27h, a crank 27i operates a support 27j for the basket 25.

In another embodiment of this invention, shown in Figure 7, brushes 28 are used instead of sponge rubber as the wipers. They are given a reciprocating motion as indicated by the arrow 29. The anode is given the same type of motion as in the preceding embodiment. The film is allowed to form at each point between the wiping passage of each bristle or group of bristles. The brushes 28, also accommodate themselves to various shapes of work pieces without any alteration in the cathode surfaces. For major differences in surface shape, however, it is desirable to use brushes of approximately corresponding shapes.

In general, however, it is advantageous to use wiping elements having substantial cross-sectional deformation of the wiper to cause it to enter and wipe the film from the smaller irregularities that are to be retained in the polished surface. This flattening of the wiper as it passes over the surface enables it to wipe a relatively large area and results in a particularly rapid and effective polishing action.

Figure 8 shows such a wiper element. It comprises a length of specially shaped rubber tubing. This wiper is generally X-shaped in cross section with longitudinal ridges, as at 80, extending radially from the center of the wiper. The wiper may be solid, but the provision of an internal longitudinal opening, as at 82, provides greater cross-sectional resiliency and better conformation with the surface being polished.

Figures 9 to 24 show apparatus particularly adapted for electro-polishing small articles. For example, it may be used to polish by electrolysis costume jewelry fabricated from brass. The electro-polishing action of this machine produces a bright image-reflecting surface that can be plated immediately with gold or other metal without any need for mechanical buffing prior to the final plating operation.

The general operation of the machine can be explained best in connection with the diagrammatic showing of Figure 9. The articles to be electro-polished are supported between spaced parallel bars 100 of a rack, generally indicated at 102. Three additional racks are provided on the machine, two of which are shown at 104 and 106 in Figure 9, but the fourth rack has been omitted from the drawing to avoid unnecessary complexity in the drawing.

Each of these racks is slidably supported for reciprocating vertical movement, as will be described presently, and extends downwardly into a tank 108 which contains the electrolyte, for example, commercial 85% phosphoric acid.

In order to recurrently wipe the protective film from the surface of the articles being polished, a set of wipers, generally indicated at 110, extend inwardly from opposing surfaces of a generally U-shaped carrier member 112. This carrier 112 is supported by a conveyor plate 114 that is arranged to travel around an oval-shaped track 116, the opposing members of the U-shaped carrier 112 passing on opposite sides of the racks 102, 104, and 106 so that the wipers 110 brush against both the front and rear surfaces of the articles being electro-polished. The track 116 is provided with straight parallel side portions so that the wiper assembly is traveling in a straight line as it passes the article-supporting racks.

Twenty-four of these carriers 112 are supported by as many conveyor plates 114, adjacent edges of which are connected by hinges to form a supporting conveyor extending completely around the track 116. Thus, the wipers 112 are passing continually over the articles being electro-polished, the articles at the same time being moved upwardly and downwardly by the supporting racks so that all parts of the articles are brushed by the wipers.

The articles being polished form the anodes of the electrolytic circuit and are connected through an insulated strap 118 to a positive supply line 120, a brush arrangement mounted in a box 122 making sliding contact between the strip 118 and the line 120.

The cathodes are formed by metal plates 124 positioned at the base of the wipers 110 and supported by the carrier 112. Each set of cathode plates 124 is connected through a conductive strap 126 to a brush 128 that makes sliding contact with a current-distribution track 130 that extends around the track 116 and is connected to a negative supply line 132.

In order to maintain the phosphoric acid bath in the tank 108 at the desired operating temperature, cooling coils, diagrammatically indicated at 134, are positioned in the tank 108. These coils are connected through an electrically-operated valve 136 to a source of cold water or other coolant (not shown). The valve 136 is operated by a thermostat control unit 138 which has a temperature sensitive element 140 immersed in the bath.

In operation, a low D.-C. voltage is applied between the anodes formed by the articles to be polished and the cathodes formed by the plates 124. The racks 102, 104, and 106 are reciprocated vertically and the carriers 112 are driven around the track 116 so that the wipers pass continually over the articles being polished. Preferably, the direction of movement of the carriers 112 is reversed periodically, for example, once each minute, to insure that the wipers 110 will reach all portions of the articles being polished. The polishing may require ten to fifteen minutes of operation.

The construction details of this particular embodiment of the invention will be best understood from a consideration of Figures 10 to 24. An shown in Figures 10 and 11, the apparatus is suspended above the tank 108 by means of a framework comprising upright members 142, formed for example of angle irons, connected at their upper ends by side members 144 and end members 145 to form a generally box-like skeleton frame.

In order to support the conveyor plates 114 and the wiper carriers 112, two channel beams 146 and 148 (Figure 11) extend lengthwise across the top of the supporting framework and are secured at each end to the cross-members 145. Two spaced vertical supporting channels 152 and 154 are supported by and extend downwardly from the beams 146 and 148 and provide the means for supporting the wiper assemblies.

Two vertically-extending heavy iron reinforcing plates 156 and 158 are secured respectively to the surfaces of the vertical channels 152 and 154. These plates support the oval track 116 which comprises an endless loop of heavy sheet steel positioned edgewise. The horizontal widths of the plates 156 and 158 are such that these members extend transversely between the straight parallel sides of the oval shape defined by the track 116, and the track 116 is secured along the edges of the plates 156 and 158.

As best shown in Figures 11 and 13, the track 116 provides vertical support for the conveyor plates 114, and also directs the movement of these conveyor plates so that they travel smoothly around the path defined by the track 116. All of the conveyor plates and wiper assemblies are identical so that a description of any one of them will suffice for all. At its upper end, each conveyor plate 114 carries a supporting roller 160 (Figure 13) that rides on the upper surface of the track 116. This roller 160 is rotatably supported on a heavy shaft 162 rigidly secured by a nut 166 near the upper end of the conveyor plate 114.

In order to prevent transverse movement of the conveyor plate 114, which would permit the roller 160 to leave the upper surface of track 116, two additional rollers 172 and 174 are positioned respectively against the inner and outer surfaces of the track 116 and are supported for rotation in a horizontal plane by short shafts extending downwardly from the shaft 162. The track 116 is positioned to extend upwardly beyond the upper ends of the reinforcing plates 156 and 158 to permit movement of the rollers 172 therealong.

With this arrangement the upper end of each of the conveyor plates 114 is supported vertically by a roller 160 riding on the top of track 116 and is prevented from lateral movement relative to the track 116 by the rollers 172 and 174.

In order to prevent lateral movement of the lower portions of the conveyor plates 114 (Figure 14) each of these conveyor plates carries near its lower end an inwardly extending cylindrical arm 176, similar to the shafts 162, secured by a nut 178. The arms 176 each carry two spaced upright shafts on which are rotatably mounted two rollers 180 and 181 arranged respectively to roll along the inner and outer surfaces of a lower track member 182. This lower track 182 is generally similar to the upper track 116 and is supported rigidly by the plates 156 and 158, the lower rim portion of the track 182 extending below the lower ends of the members 156 and 158 to permit the rollers 178 and 180 to move along the opposite surfaces thereof.

The adjacent edges of the conveyor plates 114 are hinged together as indicated at 184 in Figure 11 to form a continuous chain-like conveyor assembly extending around the tracks 116 and 182.

In order to prevent angular displacement of the conveyor plates 114 as they move along the straight side portions of the tracks 116 and 182, each of the conveyor plates carries an alignment member 186 (Figure 10) which may comprise for example a short length of angle iron secured to the outer face of the conveyor plate 114 and extending at an angle across the face of and beyond the edges of the conveyor plate. Thus, as each conveyor plate moves into position on a linear portion of its path, the ends of its alignment member 186 overlap the surfaces of the adjacent conveyor plates, thereby maintaining the conveyor plates 114 in alignment along the straight portions of the track.

Each of these conveyor plates 114 supports one of the wiper carriers 112 (Figure 14). Each of the wiper carriers 112 comprises a channel-shaped member 190 that is secured to the outer surface of one of the conveyor plates 114 and which extends downwardly nearly to the bottom of the tank 108. The channel member 190 is bent into a generally U-shaped structure having a bottom portion 192 and an outer upwardly-extending portion 194 adjacent the cooling coils 134.

The manner of supporting the wipers 110 is shown most clearly in Figure 20. Two vertically spaced supporting blocks 195 are secured within the downwardly-extending channel member 190 (see also Figure 14), and two similarly spaced blocks 196 are positioned within the opposing channel 194. Each of the blocks 195 and 196 serves as a support for two spaced parallel plastic strips 197 each having a narrower inwardly-projecting portion 198. Two sheets 200 of plastic, or other insulating material which will not be affected by the electrolytic bath, are secured to the inner faces of strip portions 198 on opposite sides of the wiper carrier 112. These plastic sheets 200 provide the support for the wipers 110, which, in this example, comprise ordinary gum-rubber tubing having a diameter, for example, of $\frac{5}{16}$ inch. If desired, wipers of the form shown in Figure 8, or of other configuration or material, can be employed. The sheet 200 is provided with spaced openings each pair of which support a generally U-shaped length of tubing, the end portions of which extend inwardly from the inner surface of the sheet 200 to form two of the wipers 110. Thus, each piece of rubber tubing extends through a hole in the sheet 200 along the rear of the sheet, and through another hole in this sheet to form a second wiper substantially parallel to but spaced vertically from the wiper formed by the opposite end portion of the tubing. These oppositely extending sets of wipers overlap along the central portion of the wiper assembly as is indicated most clearly in the lower right-hand portion of Figure 14.

Improved results can be attained with articles of most shapes by reducing the length of some of the wipers 110. For example, if one-fourth of the wipers are 25% shorter in length improved wiping action and polishing may be obtained along the edges of the articles. In some applications, the wipers 110 may include wipers of smaller and larger cross-sectional dimensions, the larger wipers providing the broader wiping action and the smaller wipers entering and wiping areas that are inaccessible to the larger wipers.

Each of the cathodes 124 is formed by a sheet of metal extending over the inner surface of each of the wiper supporting sheets 200, suitable openings beings provided in the cathodes for the wipers 110. The oppositely disposed cathode plates 124 of each wiper assembly are connected by a metal strap 214 at the bottom of the wiper assembly.

In order to connect the cathodes 124 of each of the wiper assemblies 112 with the source of electric power, one of the conductive straps 126 (Figure 14) is connected to and extends upwardly from each of the inner cathode plates 124 between the oppositely disposed edges of the channel member 190.

As best shown in Figure 13, the conductive strap 126 is supported by a block 216 of insulating material which is secured to the corresponding conveyor plate 114. A connecting member 218, which may take the form of a rivet or bolt, extends through the conducting strap 126, the insulating support block 216, an opening in the conveyor plate 114, and through a second insulating block 228 secured to the opposite side of the conveyor plate 114. This conducting member 218 is connected to a leaf spring member 230 that is secured to the inner face of the insulating block 228 and extends upwardly therefrom. At its upper end, the leaf spring member 230 carries a brush supporting member 232 and the brush 128 that makes sliding contact with the conductive track of ring 130. Electrical connection between the brush 128 and the spring member 230 is made by means of a flexible lead 235. The spring member 230 is arranged to maintain suitable pressure of the brush 234 on the outer surface of the contact ring 130. The ring 130 is supported by the upper supporting track 116 by a series of spaced blocks 236 of insulating material, and is connected to the negative voltage supply line 132 as indicated diagrammatically in Figure 9.

As mentioned above, the conveyor plates 114 and the wiper assemblies 112 carried thereby are driven in chain fashion around the oval tracks 116 and 182. The power for this driving motion is provided by an electric motor 238 (Figure 10) connected by a drive belt 240 to a gear reduction assembly 242. This speed reducer is arranged to drive a vertical shaft 244 that extends downwardly inside and near one end of the supporting track 116. Near its lower end the drive shaft 244 carries a large sprocket wheel 246 (Figure 14) the teeth of which engage teeth-like driving members 248 secured to the inner surfaces of the conveyor plates 114 (see also Figure 15).

This sprocket wheel 246 has a diameter only slightly smaller than the transverse distance between opposed conveyor plates moving along the straight portions of the endless path so that the sprocket wheel engages each of the driving teeth 248 of the conveyor plates 114 as it moves around the curved portion of its path at one end of the track.

Because the four article supporting racks, for example as indicated at 102, 104, and 106 in Figure 9, are identical, only the rack 102 and its supporting arrangement will be described in detail, it being understood that the other article supporting racks are similar thereto. The rack 102 is positioned along the linear portion of the path followed by the wiper assemblies 112 and is positioned so that the two legs of the wiper assembly pass on opposite sides of the rack 102 so that the wipers 110 extending inwardly from the opposed surfaces of the wiper assembly make contact with both sides of the articles to be polished.

The details of construction of the rack 102 and the means by which the articles to be polished are supported on the cross bars 100 will be explained later. The rack includes an outer frame comprising upright members 260 and 262 (Figure 9) and an upper cross bar 264 is connected between the upper ends of frame members 260 and 262. The rack 102 is positioned between the side members 266 and 268 of a larger frame-work formed, for example, from angle iron and arranged so that the rack 102 can slide vertically between the side members 266 and 268 to permit easy removal of the racks 102. These side members are joined at the top by a cross bar 272 and at the bottom by a lower cross bar 274.

As best shown in Figure 16, a rack 102 is maintained between the upright members 266 and 268 by a metal strap 276 which is connected substantially at the center of the cross bar 264 and extends upwardly and is connected at its upper end to a horizontal projection 278 on the lower end of the strip 118 by a wing bolt 282. This conductive strap 276 serves to position the rack 102 in the framework and also provides an electrical connection for the articles which are to be polished.

The contact strip 118 is supported near its lower end by a panel 286, of plastic or similar material, that extends across the two upright frame members 266 and 268. A wing bolt 287 extends through clearance openings in the strip 118 and an insulating block 288 and is in threaded engagement with the panel 286. The strip 118 is supported also by the upper cross bar 272 (Figures 9 and 13) from which it is insulated by means of a block of insulating material 290.

Electrical contact is made to the contact strip 118 by means of the brush-holding box 122 through which the strip 118 passes. Within the box 122 are mounted four brushes 294 (shown in section in the right-hand portion of Figure 13) which are pressed by means of springs 296 against the surface of the strip 118. The box 292 is supported on a block of insulating material 298 mounted on a frame member 299.

In order to permit reciprocation of the articles to be polished, the entire rack supporting assembly is arranged for vertical movement. The panel 286 shown in Figure 16 extends beyond the upright members 266 and 268 and at opposite ends carries two guide pulleys 300 and 302. The rim of the guide pulley 300 engages a cylindrical guide post 304 supported by a vertical frame member 306. The other guide pulley 302 engages a similar guide post 308 supported by a frame member 310.

As best shown in Figure 10, the upright member 266 supports at its upper end a block 312 on which is rotatably mounted another guide pulley 314 that engages another vertical guide post 316 that is also mounted on the frame member 306 which serves as a track for the wheel 314. On the opposite side of the rack-supporting frame, a similar block 318 carried by the upright frame member 268 rotatably supports a similar guide pulley 320 which engages a guide post or track 322 supported by the vertical frame member 310.

Thus, the entire assembly supported by the upright frame members 266 and 268 and the cross bar 272 is movable vertically. Vertical movement is imparted to the rack assembly by means of a vertically-positioned drive member 324 connected at its lower end to the cross bar 272 and at its upper end to two spaced cross members 326 and 328. The opposite ends of these cross members are connected to a second vertical drive member 330, the lower end of which is connected to the adjacent rack-supporting frame 104 as best shown in Figure 9. A roller 332 (Figure 10), having an external diameter equal to the vertical distance between the cross members 326 and 328, is positioned between these members and is rotatably secured to a drive wheel 334. The roller 332 is mounted eccentrically on the wheel 334 to form a crank assembly so that as the wheel 334 is rotated the roller 332 alternately raises and lowers the two rack assemblies.

As shown in Figure 13, the wheel 334 is keyed to a drive shaft 336 supported by bearings 338 and 340 mounted on the framework of the machine. The opposite end of this shaft carries a similar crank assembly comprising a wheel 342 and an eccentrically-mounted roller 344 for vertically reciprocating the rack assemblies on the opposite side of the machine.

The shaft 336 also carries a pulley wheel 346 connected by a belt 348 (Figure 10) to a gear reduction unit 352 that is driven through a belt 354 by an electric motor 356.

It will be noted that a separate motor is used to produce the vertical movement of the rack assemblies and the transverse movement of the wiper assemblies. This is in order to prevent establishing any synchronized or fixed phase relationship between the two motions so that no recurrent wiping pattern will be formed on the articles being polished. The desired random relationship may be obtained in any desired manner. For example, a single drive motor may be utilized with one or both of the movements driven through fluid coupling devices so operated that a synchronized relationship will not be maintained between the two motions.

In order to place articles in the machine or remove them therefrom, the article-supporting racks are removed from the machine. This is accomplished by loosening the wing bolt 287 (Figures 16, 17 and 18) to disconnect the strip 118 from the panel 286 and sliding the rack, for example rack 102, upwardly between the frame members 266 and 268 until a catch member 358 mounted on the strip 118 (Figure 18) engages a latch member 362 supported by the cross bar 272 to lock the strip 118 in this position. The wing bolt 282 is then loosened and the rack 102 is lifted upwardly out of the tank 108.

Figures 21 and 22 illustrate the details of one type of rack suitable for use in the machine just described. The cross bars 100 carry a plurality of hangers 364, for example, formed of tungsten wire in the form of a loop the ends of which are secured to the cross bar 100. The loop extends upwardly and forwardly from the cross bar and is then bent downwardly so that the article to be polished, for example an ear ring as indicated at 366, can be hung on the downwardly extending loop.

In order to securely grip the articles so that they will not be loosened by the action of the wipers, a plurality of hooks 368 are provided, each positioned directly beneath one of the hangers 364. The hooks 368 are supported by and extend upwardly from spaced cross bars 372 which are mounted in a frame having upright supports 374 and 376 and an upper cross member 378; the corresponding lower cross member is not shown. This latter frame is supported by four guide members having slotted end portions to permit relative movement of the two frames. Only two of these guide members are shown at 382 and 384 secured respectively to the upright frame members 374 and 376. The guide members 382 and 384 are parallel with each other and are positioned at an angle relative to the cross bars 372 so that when wing nuts 386, by which the guide members are secured to uprights 260 and 262, are loosened the frame and hooks can be moved along a path parallel to the slots in the guide members 382 and 384. Thus, the frame supporting the hooks 368 can be moved upwardly and to the right, as viewed in Figure 21, permitting some portion of the articles to be supported, for example the clamp portions of ear rings 366, to be placed on the hangers 364. When the movable frames are returned to and clamped in the position shown in Figure 21, the hooks 368 engage the supported article and exert a downward force to securely clamp the article in position. Preferably the hooks 368 are formed from spring metal plated with material that is not affected adversely by the bath or by electrolysis.

The rack must also provide connection between the article being treated and the positive voltage supply line. In this particular example the connection is made through the hooks 368 which are formed of tungsten wire or which are coated with tungsten. Tungsten is particularly suitable for this purpose as it is not affected by the acid bath and is not deplated readily. The cross bars 372 that support the hooks 368 are of metal so as to provide the desired electrical connection, but are coated with a suitable resist, for example a bituminous material that is not affected by the bath.

Figures 23 and 24 show another form of article-supporting rack. The cross bars 392 and 394 are provided with metal facing plates 396 which are covered with a suitable resist. A hanger 398, formed of two lengths of tungsten wire, is welded or otherwise secured to the face place 396 of the cross arm 392 and forms a downwardly-extending partial loop as best shown in Figure 24. The open portion of the hanger permits a closed loop portion of articles to be supported to be hung on the hanger. This hanger 398 is not coated with resist so that it provides the desired electrical contact with the article to be polished.

In order to provide a further support for the article to be polished, a hook, generally indicated at 402, is provided with an upwardly extending hook portion 404, downwardly extending loop portion 406, and a straight end portion 408 that extends downwardly into a clearance opening in the cross bar 394.

The hook 402 is retained by a rubber band 410 that extends around the cross bar 394 and through the loop portion 406 of the hook 402.

In positioning the article on the rack, it is placed on the hanger 398, for example as indicated by the ear ring 412 in Figure 23, and the lower hook 402 is then extended upwardly and hooked onto a suitable portion of the article. The tension in the rubber band 410 produced by pulling the hook 402 upwardly assures that the article will not be dislodged by the subsequent wiping action.

The face plates 396 are connected electrically to the strap 276 which as described above is connected to the positive voltage supply line.

If a surface to be electro-polished is substantially planar with relatively large smooth areas, somewhat better results may be attained by means of a flexible web or belt instead of the separated wipers as described above. Such a machine is shown in Figure 25.

The electrolyte 500 is contained in a tank 502. An idler roller 504 is supported rotatably in a vertical position by any suitable means, for example by a standard 506 at the upper end and by a suitable bearing (not shown) at the lower end. A similar roller 508 is suitably supported in a vertical position near the opposite end of the tank 502.

An endless belt 512 passes over and is supported by the rollers 504 and 508. This belt is arranged to pass over and brush against the surface of metal articles 514 which are to be electro-polished. A relatively open mesh cloth is best suited for the belt 512 so that the anodic corrosion products removed from the articles 514 by the belt 512 are readily washed out of the belt as it moves around its endless path in the solution. The cloth from which the belt 512 is formed is preferably one which will not disintegrate or ravel in the solution because fine threads or shreds of cloth or other foreign material in the solution tend to produce striations in the polished surface. The cloth may be formed of natural or synthetic fibers or it may be formed of plastic or rubber material. The belt may be either woven or molded.

The articles 514 which are to be electro-polished are supported by a rack 516 that is slidably supported in vertical frame members 518. The rack 516 is connected by a vertical drive bar 522 to a cam-driving arrangement, generally indicated at 524. The rack 516 is reciprocated vertically by means of an electric motor 526 that is connected through a belt 528 and a pulley 532 which rotates a shaft 534 that drives the cam-arrangement 524. Any desired arrangement for reciprocating the rack 516 may be used.

The articles 514 are connected as anodes in the polishing circuit and a cathode is provided by a metal sheet 536 positioned in the tank 502 on the opposite side of the belt 512 from the articles 514. The electrical connections to the anodes and cathodes, which can be made in any convenient manner, have been omitted from the drawing for simplification.

In order to drive the belt 512, the roller 508 is driven by a shaft 538 connected to a gear box, diagrammatically indicated at 540, that is in turn driven through a belt 542 by an electric motor 544. As in the previous example, separate motors are utilized to produce the two components of the relative motion between the belt 512 and the anodes 514 to avoid any possibility of establishing a recurrent wiping pattern.

Figure 26 shows another embodiment of the machine shown in Figures 9 to 24. In this machine spaced wipers 110 are positioned on both sides of the rack 102 similar to the arrangement shown in Figure 9. In this example, however, the wipers are spaced horizontally over a horizontal distance substantially greater than the width of the rack 102 that supports the articles to be polished. Instead of moving the wipers 110 continuously along an endless path, they are reciprocated along a horizontal path, the length of the stroke being sufficient that at least some of the wipers move in one continuous movement completely across and beyond the surface to be polished. This movement insures an efficient wiping action and gives better wiping action on the edges of the anodes.

As in the preceding embodiment, vertical reciprocating motion is imparted to the rack 102, for example, by an arrangement generally indicated at 550 which is basically similar to that described in connection with the foregoing examples.

In order to provide the desired movement of the wipers 110, the wiper carrier 112A is slidably supported on two spaced horizontal bars 552 and 554. A wheel 556 is provided with an eccentrically mounted roller 558 that projects into a slot 560 in a vertical driver plate 562 secured to the wiper carrier 112A. When the wheel 556 is rotated by any suitable driving arrangement, the desired reciprocating movement of the wipers 110 is obtained. As before, the two components of driving motion should have no synchronous relationship.

The apparatus described herein may be used also in connection with electro-forming operations. For example, where it is desired to form a substantial thickness of metal, improved results can be attained by alternately plating and electro-polishing the article. For example, the surface to be coated may be first plated and then subsequently electro-polished in accordance with the foregoing examples, the electro-polishing serving only to smooth the surface of the plate but not being permitted to remove any substantial portion of the plate. Another layer of metal is then applied by electroplating and this is again electro-polished, the process being repeated until the desired thickness is obtained. The alternate plating and de-plating operations may take place in separate baths, but in some instances the same bath and apparatus may be used for both the plating and de-plating operations. The wiping action may be utilized also during the plating operation in order to increase the rate of deposit and increase the strength of the plated material.

When the apparatus described herein is used to perform the plating operation, suitable cathode structure must be provided to supply the desired metal ions. This can be accomplished, for example, by utilizing as the cathode spheres of the desired metal supported in a wire basket immersed in the bath.

From the foregoing, it will be observed that the apparatus embodying our invention is well adapted for the attainment of the ends and objects hereinbefore set forth, and that it is subject to a variety of modifications as may be desirable in adapting the invention to different operations. Moreover, it is apparent that certain features of the invention may be used to advantage in particular applications without a corresponding use of other features.

This application is a continuation-in-part of our application Serial No. 5,978, filed February 3, 1948, now Patent Number 2,549,946.

What is claimed is:

1. Apparatus for electro-polishing metal articles comprising a tank for holding electrically conductive film-forming liquid, a supporting frame extending above said tank, article-supporting racks, means on each of said racks for supporting articles to be polished, means on said frame for supporting said racks for vertical movement within said tank, first drive means for reciprocating vertically said racks, a plurality of wiper carriers having vertically-extending juxtaposed leg portions, supporting means on said frame for supporting said wiper carriers for movement along a path adjacent said racks and so directed that juxtaposed leg portions of said wiper carriers pass on opposite sides of said racks, second drive means for moving said wiper carriers along said path, a plurality of spaced resilient wipers carried by each leg portion of said wiper carriers, said wipers extending inwardly so as to pass along opposite sides of said racks, and means for making electrical connection to said article-supporting means on each of said racks.

2. Apparatus for electro-polishing metal articles comprising a tank for holding electrically conductive liquid, a supporting frame extending above said tank, a plurality of article-supporting racks, a plurality of hangers on each of said racks for supporting and making electrical contact with articles to be polished, means on said frame for supporting said racks for vertical movement within said tank, first motor drive means for reciprocating vertically said racks, a plurality of wiper carriers having vertically-extending juxtaposed leg portions, supporting means on said frame for supporting said wiper carriers for movement around an endless path positioned so that juxtaposed leg portions of said wiper carriers pass on opposite sides of said racks, second motor drive means for moving said wiper carriers along said path, reversing means for reversing the direction of movement of said wiper carriers, and a plurality of wipers carried by each leg portion of said wiper carriers and extending inwardly so as to pass along opposite sides of said racks, each of said wipers being formed of elongated resilient material capable of being readily deformed in cross-section.

3. Apparatus for electro-polishing metal articles comprising a tank for holding a bath of electrically-conductive liquid, said liquid being of such a nature as to form a protective film on anodic surfaces placed in said bath, a supporting frame extending above said tank, a plurality of article-supporting racks, a plurality of tungsten-wire hangers on each of said racks for supporting articles to be polished, means on said frame for supporting said racks for vertical movement within said tank, first motor drive means for reciprocating vertically said racks, a plurality of wiper carriers having vertically-extending juxtaposed leg portions, metal cathode plates each carried by one of said leg portions, a plurality of conveyor plates each supporting one of said wiper carriers, hinge means connecting said conveyor plates to form an endless chain, supporting means on said frame for supporting said conveyor plates for movement along an endless path positioned so that juxtaposed leg portions of said wiper carriers pass on opposite sides of said racks, second motor drive means operating independently of said first motor drive means for moving said conveyor chain along said path, reversing means for reversing the direction of movement of said conveyor chain, a plurality of wipers carried by each leg portion of said wiper carriers and extending inwardly so as to pass along opposite sides of said racks, each of said wipers being formed of rubber tubing, a source of electric power, and means connecting said power source to said cathode plates and to said wire hangers.

4. Apparatus for the electrolytic treatment of the surface of metal articles that comprises a bath container, means to support articles within said container, means also within the container for wiping the surfaces of the articles on said support means, first means relatively to move said support means and said wiping means back and forth in mutual wiping relation at a frequency and second means actuated independently of said first means relatively to move said support means and wiping means transversely of the direction of said back and forth movement at a frequency completely independent of the frequency of the movement of first means, the actual relative movement of said support and wiping means being at any time the instantaneous component of the movements of said first and second means.

5. Apparatus for the electrolytic treatment of the surface of metal articles that comprise a bath container, means to support articles within said container, means to hold a plurality of spaced unitary wipers adjacent and projecting toward said article support means, each of said wipers comprising a flexible, resilient, hollow, elongated element which is readily deformable in cross section, first means relatively to move said support means and said holding means back and forth in mutual wiping relation at a frequency, and second means driven independently of said first means relatively to move said support means and said holding means transversely of the direction of said back and forth movement at a frequency completely independent of the frequency of the movement of the first means, the actual relative movement of said support and wiping means being at any time the instantaneous component of the movements of said first and second means.

6. Apparatus for the electrolytic treatment of the surface of metal articles that comprise a bath container, means to support articles within said container, means to hold a plurality of spaced unitary wipers adjacent and projecting toward said article support means, each of said wipers comprising a flexible, resilient, hollow, elongated element of cruciform cross section in repose but which is readily deformable in cross section, first means relatively to move said support means and said holding means back and forth in mutual wiping relation at a frequency, and second means driven independently of said first means relatively to move said support means and said holding means transversely of the direction of said back and forth movement at a frequency completely independent of the frequency of the movement of the first means, the actual relative movement of said support and wiping means being at any time the instantaneous component of the movements of said first and second means.

References Cited in the file of this patent

UNITED STATES PATENTS

| | | |
|---|---|---|
| 1,215,354 | Eaton | Feb. 13, 1917 |
| 1,262,248 | Perreru-Lloyd | Apr. 9, 1918 |
| 2,074,222 | Holland | Mar. 16, 1937 |
| 2,086,226 | Hoff | July 6, 1937 |
| 2,171,437 | Tannehill | Aug. 29, 1939 |
| 2,410,213 | Herro et al. | Oct. 29, 1946 |
| 2,514,923 | Batina | July 11, 1950 |
| 2,539,455 | Mazia | Jan. 30, 1951 |
| 2,549,946 | Treuhaft et al. | Apr. 24, 1951 |

FOREIGN PATENTS

| | | |
|---|---|---|
| 18,643 | Great Britain | of 1899 |
| 3,087 | Great Britain | of 1904 |